Jan. 18, 1944.　　C. A. JOHNSON　　2,339,571
TESTING DEVICE
Filed Nov. 12, 1941　　2 Sheets-Sheet 1
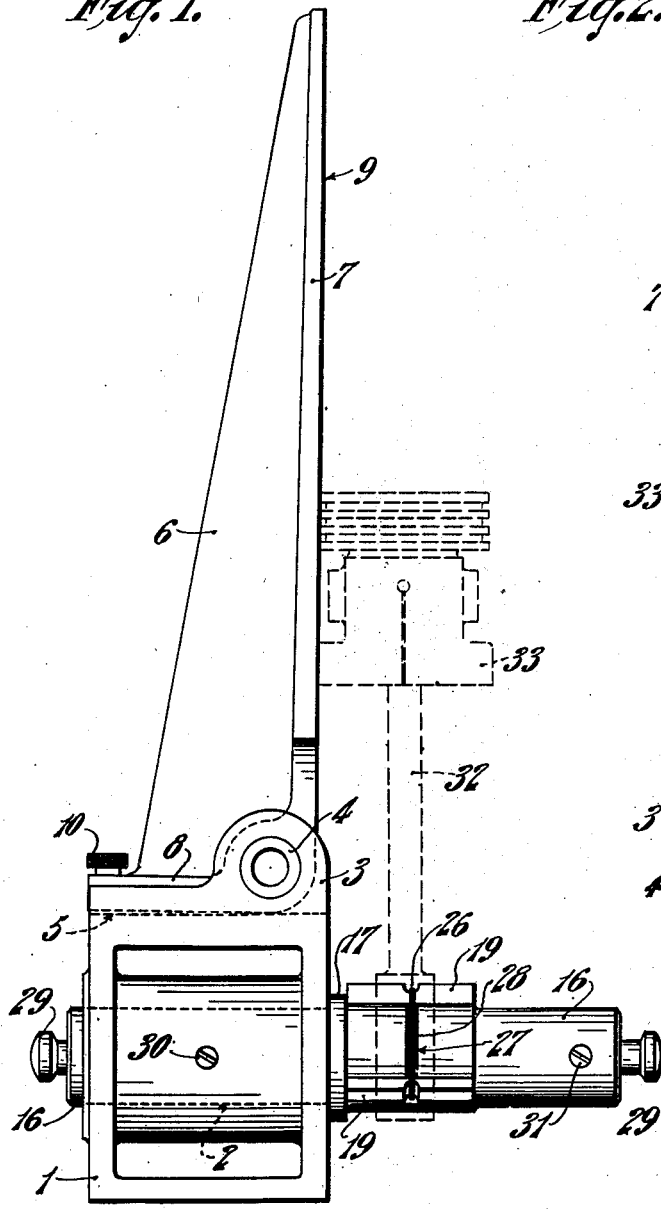
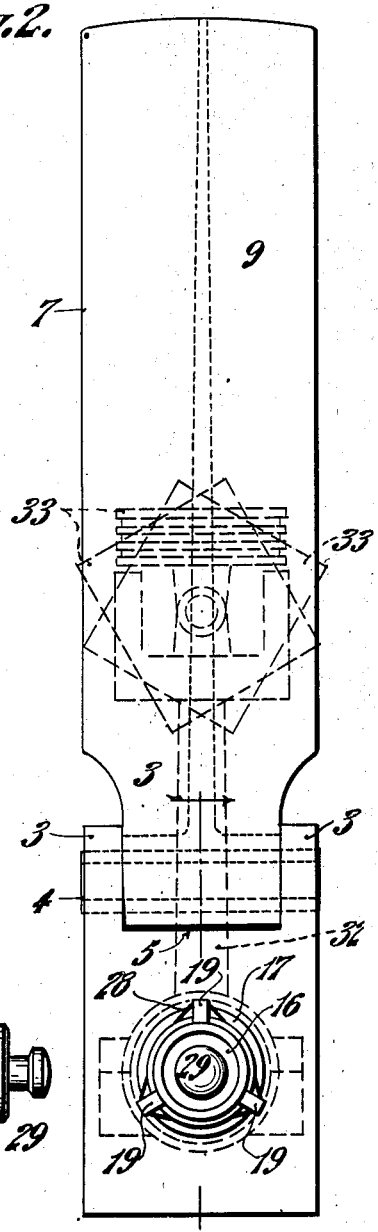
INVENTOR,
Carl A. Johnson,
BY
ATTORNEY.

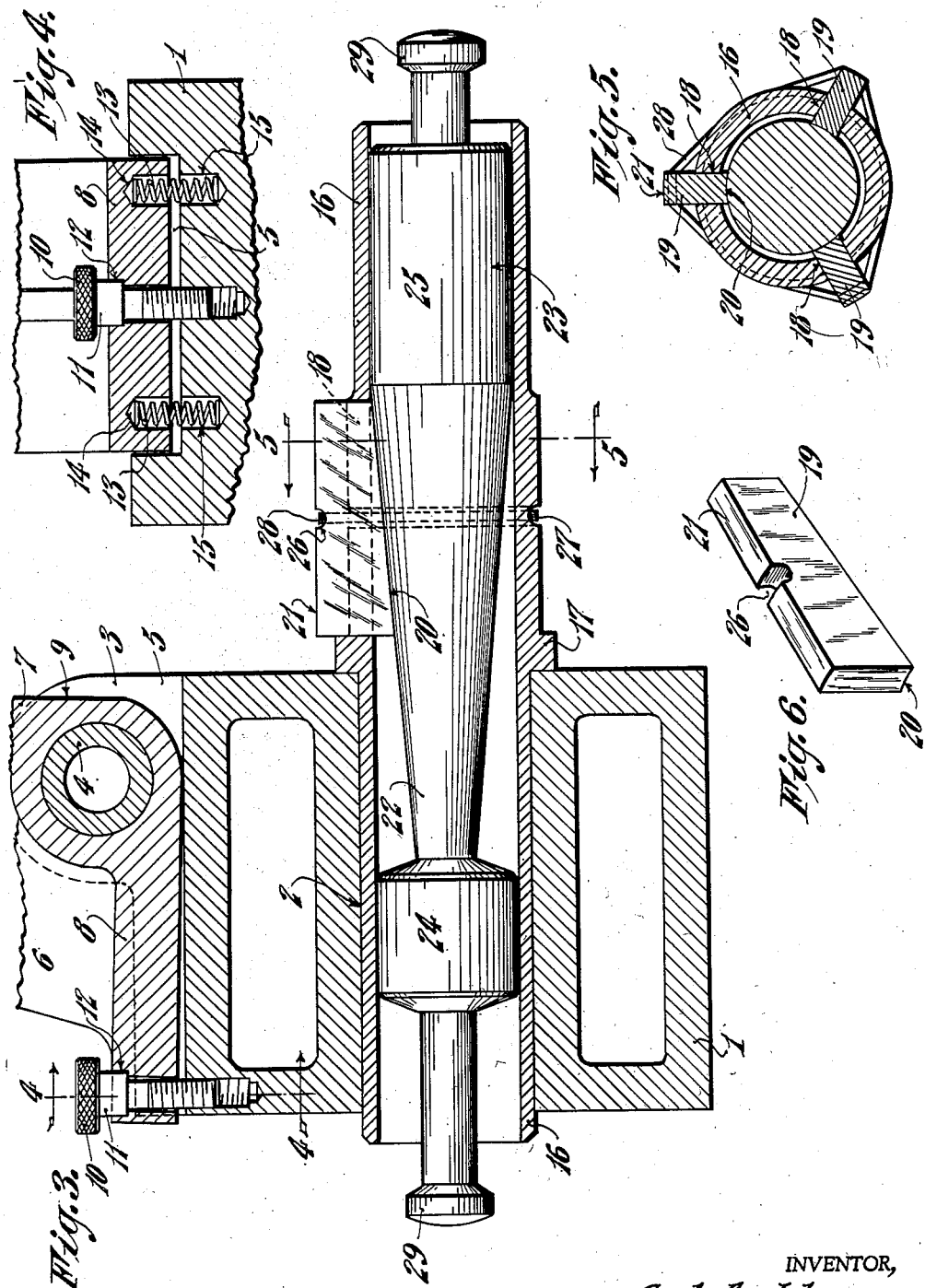

Patented Jan. 18, 1944

2,339,571

UNITED STATES PATENT OFFICE 2,339,571

TESTING DEVICE

Carl A. Johnson, Springfield, Mass.

Application November 12, 1941, Serial No. 418,710

1 Claim. (Cl. 33—180)

This invention relates to improvements in testing devices, and is particularly pertinent to that type of testing device principally used for testing the alignment of connecting rods, and their proper relation to the piston to which they are connected.

In devices of this nature which have been in use in the trade, the connecting rod, with piston connected, is mounted on a fixed shaft secured in a frame having a flat face, with the plane of the flat face parallel to the theoretical axis of the connecting rod. The connecting rod is positioned on the shaft with the side of the piston in close juxtaposition to the flat face of the frame, and the piston is oscillated on its wrist pin to pass the piston back and forth across the flat face. The variation in relative spacing between the piston and face are noted, and the connecting rod straightened to eliminate this variation. These steps are repeated until no variation shows as the piston is passed across the flat face of the frame.

There are several improvements in this invention, relative to the structure above described. First, the bores in connecting rods, on the crankshaft ends, vary widely in diameter. It is therefore necessary, in apparatus now in use, to provide a large number of interchangeable shafts to accommodate these varying diameters. It is an object of this invention to provide a single shaft, equipped with accurately machined, expanding means for automatically fitting the bore of the connecting rod, with means for manipulating the expanding means, and for setting them in proper position. Second, both in new and in replacement or repair work, the diameter of the piston varies from top to bottom, and it is impossible to accurately align the side of the piston with a fixed flat surface. It is therefore, a further object of this invention to provide, in a device of the character described, a movable arm member having a flat face or surface, with means for adjustably positioning the plane of the flat surface relative to the axis of the supporting shaft and the axis of a connecting rod and piston supported on the shaft.

These, and other objects and advantages of this invention will be completely and concisely disclosed and described in the following specification, the accompanying drawings, and the appended claim.

Broadly, this invention comprises a base block provided with a horizontal bore, a hollow shaft supported in the bore, a plurality of centering keys or wedges projecting through the hollow shaft, a tapered spindle slidably supported in the hollow shaft and contacting the wedges for forcing the wedges outwardly into contact with the bore of a connecting rod slipped onto the shaft, and an arm member movably supported on the top of the base block and provided with a flat face normally positioned in a plane perpendicular to the axis of the hollow shaft, means for adjustably positioning the arm member to vary the relation of the plane of the flat face to the axis of the shaft.

A preferred embodiment of this invention is illustrated in the accompanying drawings, in which Fig. 1 is a side elevational view of the testing device, Fig. 2 is a front elevational view of the same, Fig. 3 is a longitudinal sectional view taken on the line 3—3 of Fig. 2, Fig. 4 is a sectional view taken on the line 4—4 of Fig. 3, Fig. 5 is a cross sectional view taken on the line 5—5 of Fig. 3, and Fig. 6 is a perspective view of one of the keys or wedges.

Referring now to the drawings in detail, in which like numerals refer to like parts throughout, A base block 1 is formed with a horizontal bore 2 and oppositely positioned ears or lugs 3 projecting above the top of the block 1. The ears 3 are bored to receive a shaft or pin 4, and the top of the block 1 is formed with a channel or groove 5 which is substantially parallel to the axis of the bore 2.

An angular arm member 6, having one leg 7 projecting upwardly above the base block 1 and the other leg 8 extending backwardly and guided in the channel 5, is pivotally supported on the pin 4, and the leg 7 is formed with a flat face 9. The arm 6 is normally positioned with the flat face 9 in a plane which is perpendicular to the axis of the bore 2, but means is provided for changing or adjusting the relation of the plane of the face 9 to the axis of the bore 2. A screw 10, having a shouldered portion 11 which is engaged in a socket 12 in the leg 8, is threadably engaged in the block 1. Springs 13 confined in sockets 14 formed in the leg 8, and opposed, registering sockets 15 in the block 1, tend to move the arm 6 in clockwise direction about its pivotal shaft 4, as seen in Fig. 1, and the screw 10 limits this movement. Turning the screw 10 down will also move the arm 6 in a counterclock-wise direction, as seen in Fig. 1. Thus, the plane of the face 9 may be accurately positioned relative to the axis of the bore 2 by cooperation of the screw 10 and springs 13.

A hollow shaft 16 is slidably supported in the bore 2, and is formed with an enlarged ring portion 17 which provides a stop for limiting the movement of the shaft 16 into the bore 2. The shaft 16 is formed with a plurality of radial slots 18, in which accurately machined wedge blocks 19 are slidably guided. The bottom surfaces 20 and top surfaces 21 of the wedge blocks 19 diverge toward the base block 1, as indicated in Fig. 3, and the bottom surfaces 20 are engaged on a tapered surface 22 of a spindle 23 which is slidably guided by bearing portions 24 and 25 in the bore of the shaft 16. The surfaces 20 of the wedge blocks 19 are concave, to fit the surface of the spindle 23, and the top surfaces 21 are convex, having a radius smaller than the smallest bore of connecting rod which may be used with the device, so that an accurate three point contact with the bore of the connecting rod is assured. The tapered surfaces 20 and 22 are designed to position the top surfaces 21 of the wedge blocks 19 parallel to the axis of the spindle 23, as best indicated in Fig. 3. The wedge blocks 19 are formed with transverse grooves 26, and the shaft 16 is formed with a registering groove 27, and an elastic band or belt 28 is located in the grooves 26 and 27, thereby drawing the wedge blocks 19 radially inward and maintaining contact of the blocks 19 with the tapered surface 22 of the spindle 23. The spindle 23 is provided, at each end, with operating buttons 29. A set screw 30 in the base block 1 may be used to hold the shaft 16, and a set screw 31 in the shaft 16 may be used to hold the spindle 23 in operating position.

In operation, the spindle 23 is partially withdrawn to permit the wedges 19 to move inwardly until their outside diameter, in combination, is less than the diameter of the bore of the connecting rod to be placed thereon. A connecting rod 32, with piston 33 assembled thereon, is slipped over the wedges 19, and the spindle 23 pushed inwardly until the wedges 19 engage the bore of the connecting rod. At this stage, the connecting rod is held loosely on the wedges 19, to permit sliding longitudinally on the wedges. The connecting rod is then moved toward the face 9 of the arm 6 until the portion of the piston which is largest in diameter engages the face 9. The arm 6 is then adjusted by means of the screw 10 until both top and bottom of the piston 33 engage the face 9, and the spindle 23 is then forced inwardly until the wedges 19 tightly grip the bore of the connecting rod 32, and hold the connecting rod to prevent any movement thereof. The piston 33 is then oscillated on its wrist pin, as indicated in Fig. 2, and any binding against the face 9 or movement away from the face 9, is noted. The connecting rod is then removed, corrected, and retested, until the piston contacts the face 9 lightly in all positions. To release the connecting rod from the grip of the wedges 19, it is merely necessary to withdraw the spindle 23 slightly. The wedges 19, and the taper 22 of the spindle 23, in cooperation, will accommodate connecting rods having a substantial range in bore diameters. Extra sets of wedge blocks 19 are provided to accommodate connecting rods having bores which fall outside of this range.

What I claim is:

A testing block for connecting rods comprising a base block, a shaft secured in said base block, an arm pivotally supported on said base block with its pivotal axis perpendicular to the axis of said shaft, said arm being provided with a plane face parallel to its pivotal axis, means on said shaft for receiving, centering, and gripping the bearing of a connecting rod, means for adjustably positioning said arm about its pivotal axis comprising a screw engaged in said arm and threaded into said base block and a compression spring engaged in registering sockets in said arm and said base block.

CARL A. JOHNSON.